(12) United States Patent
Jin et al.

(10) Patent No.: US 12,664,607 B2
(45) Date of Patent: Jun. 23, 2026

(54) METHOD AND APPARATUS FOR GENERATING VIDEO INTERMEDIATE FRAME

(71) Applicant: SAMSUNG ELECTRONICS CO., LTD., Suwon-si (KR)

(72) Inventors: Xin Jin, Nanjing (CN); Ban Chen, Nanjing (CN); Longhai Wu, Nanjing (CN); Jie Chen, Nanjing (CN); Jayoon Koo, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 18/658,694

(22) Filed: May 8, 2024

(65) Prior Publication Data

US 2024/0428371 A1      Dec. 26, 2024

Related U.S. Application Data

(63) Continuation of application No. PCT/IB2024/052668, filed on Mar. 20, 2024.

(30) Foreign Application Priority Data

Jun. 21, 2023      (CN) .......................... 202310745901.2

(51) Int. Cl.
        *G06T 3/18*          (2024.01)
        *G06V 10/74*        (2022.01)
        (Continued)

(52) U.S. Cl.
        CPC .............. *G06T 3/18* (2024.01); *G06V 10/761* (2022.01); *G06V 10/82* (2022.01); *G06V 20/48* (2022.01)

(58) Field of Classification Search
None
See application file for complete search history.

(56) References Cited

U.S. PATENT DOCUMENTS 10,812,825 B2 *  10/2020  Liu ........................ H04N 7/014
11,122,238 B1      9/2021  van Amersfoort et al.
                    (Continued)

FOREIGN PATENT DOCUMENTS

CN          114071223 A      2/2022
CN          112104830 B      9/2022
                    (Continued)

OTHER PUBLICATIONS

International Search Report (PCT/ISA/210) issued on Jun. 19, 2024 by the International Searching Authority in International Application No. PCT/IB2024/052668.
(Continued)

*Primary Examiner* — Soo Shin
(74) *Attorney, Agent, or Firm* — Sughrue Mion, PLLC

(57)                    ABSTRACT

A method for generating a video intermediate frame includes performing a warp operation on a plurality of target video frames, based on a bidirectional optical flow between the plurality of target video frames, to obtain a plurality of pictures, determining a similarity between sub-pictures corresponding to image sub-regions in the plurality of pictures, predicting, based on the similarity, a network depth of a frame synthesis network matched with a corresponding image sub-region, the network depth increasing as the similarity decreases, performing synthetic processing, using the frame synthesis network, on corresponding sub-pictures of each of the image sub-regions, based on the network depth matched with the corresponding image sub-region, to obtain a plurality of images, and splicing the plurality of
(Continued)

200

210
    210b  210c
210a

Overlapping warped pictures

220

230

| 1 | 2 | 4 | 1 |
|---|---|---|---|
| 1 | 1 | 1 | 1 |

Depth prediction of synthetic networks at an image block level

Lightweight fully convolutional network images to obtain intermediate frames of the plurality of target video frames, based on each of the image sub-regions.

15 Claims, 6 Drawing Sheets

(51) Int. Cl.
    *G06V 10/82*     (2022.01)
    *G06V 20/40*     (2022.01)

(56)           References Cited

U.S. PATENT DOCUMENTS

| | | | |
|---|---|---|---|
| 11,363,271 | B2 | 6/2022 | Li et al. |
| 12,185,023 | B2 | 12/2024 | Jin et al. |
| 2002/0048395 | A1* | 4/2002 | Harman .................. G06T 7/507 |
| | | | 382/154 |
| 2019/0138889 | A1 | 5/2019 | Jiang et al. |
| 2020/0035362 | A1* | 1/2020 | Abou Shousha ...... G06N 3/096 |
| 2021/0281867 | A1* | 9/2021 | Golinski ................ G06N 3/045 |
| 2022/0092795 | A1 | 3/2022 | Liu et al. |
| 2022/0284552 | A1 | 9/2022 | Yang et al. |
| 2022/0375030 | A1 | 11/2022 | Choi et al. |
| 2022/0383573 | A1 | 12/2022 | Schroers et al. |
| 2023/0007240 | A1 | 1/2023 | Li et al. |
| 2023/0214458 | A1* | 7/2023 | Marsden ................ G06V 40/28 |
| | | | 382/157 |
| 2023/0345020 | A1* | 10/2023 | Yu ............................ G06T 7/50 |
| 2024/0029196 | A1* | 1/2024 | Barragán del Rey ...................... |
| | | | G06T 3/4046 |
| 2024/0146868 | A1 | 5/2024 | Zhang et al. |

FOREIGN PATENT DOCUMENTS

| | | |
|---|---|---|
| CN | 115065796 A | 9/2022 |
| KR | 10-2242343 B1 | 4/2021 |
| KR | 10-2467673 B1 | 11/2022 |
| KR | 10-2022-0158598 A | 12/2022 |
| WO | 2021/085757 A1 | 5/2021 |
| WO | 2022/099313 A1 | 5/2022 |
| WO | 2022/267957 A1 | 12/2022 |

OTHER PUBLICATIONS

Written Opinion (PCT/ISA/237) issued on Jun. 19, 2024 by the International Searching Authority in International Application No. PCT/IB2024/052668.

Niklaus, Simon et al., "Softmax Splatting for Video Frame Interpolation", CVPR, 2020, pp. 5437-5446. (10 pages total).

Choi, Myungsub et al., "Channel Attention Is All You Need for Video Frame Interpolation", The Thirty-Fourth AAAI Conference on Artificial Intelligence (AAAI-20), 2020, pp. 10663-10671. (9 pages total).

Choi, Myungsub et al., "Motion-Aware Dynamic Architecture for Efficient Frame Interpolation", ICCV, 2021, pp. 13839-13848. (10 pages total).

Xue, Tianfan et al., "Video Enhancement with Task-Oriented Flow", International Journal of Computer Vision, arXiv:1711.09078v3 [cs. CV], Nov. 10, 2019. (20 pages total).

Lee, Hyeongmin et al., "AdaCof: Adaptive Collaboration of Flows for Video Frame Interpolation", CVPR, 2020, pp. 5316-5325. (10 pages total).

Park, Junheum et al., "Asymmetric Bilateral Motion Estimation for Video Frame Interpolation", ICCV, 2021, pp. 14539-14548. (10 pages total).

Communication dated Feb. 3, 2026 issued by the European Patent Office in European Patent Application No. 24825403.9.

Yizeng Han et al., "Dynamic Neural Networks: A Survey", arXiv:2102. 04906v2 [cs.CV], Feb. 10, 2021, XP081877781, pp. 1-20 (20 pages total).

* cited by examiner

FIG.  1

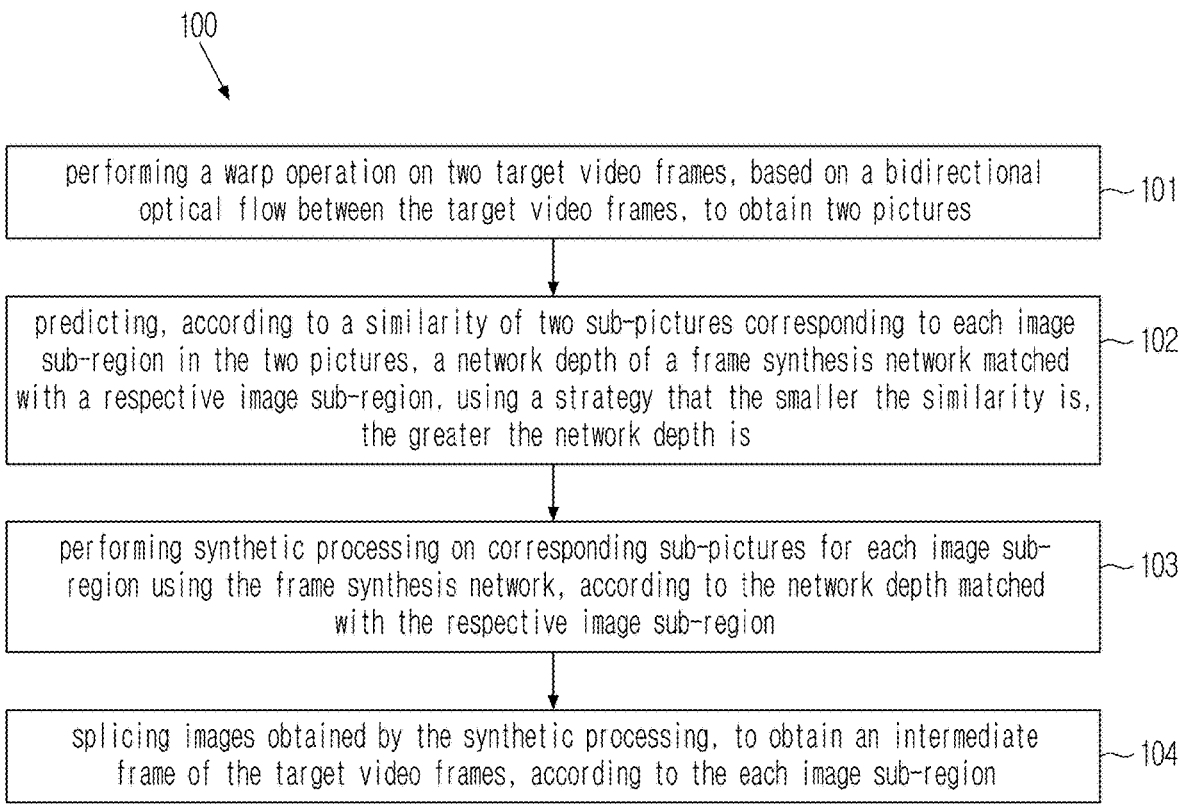

100 performing a warp operation on two target video frames, based on a bidirectional optical flow between the target video frames, to obtain two pictures — 101 predicting, according to a similarity of two sub-pictures corresponding to each image sub-region in the two pictures, a network depth of a frame synthesis network matched with a respective image sub-region, using a strategy that the smaller the similarity is, the greater the network depth is — 102 performing synthetic processing on corresponding sub-pictures for each image sub-region using the frame synthesis network, according to the network depth matched with the respective image sub-region — 103 splicing images obtained by the synthetic processing, to obtain an intermediate frame of the target video frames, according to the each image sub-region — 104

Overlapping warped pictures

Lightweight fully convolutional network

Depth prediction of synthetic networks at an image block level

FIG. 3

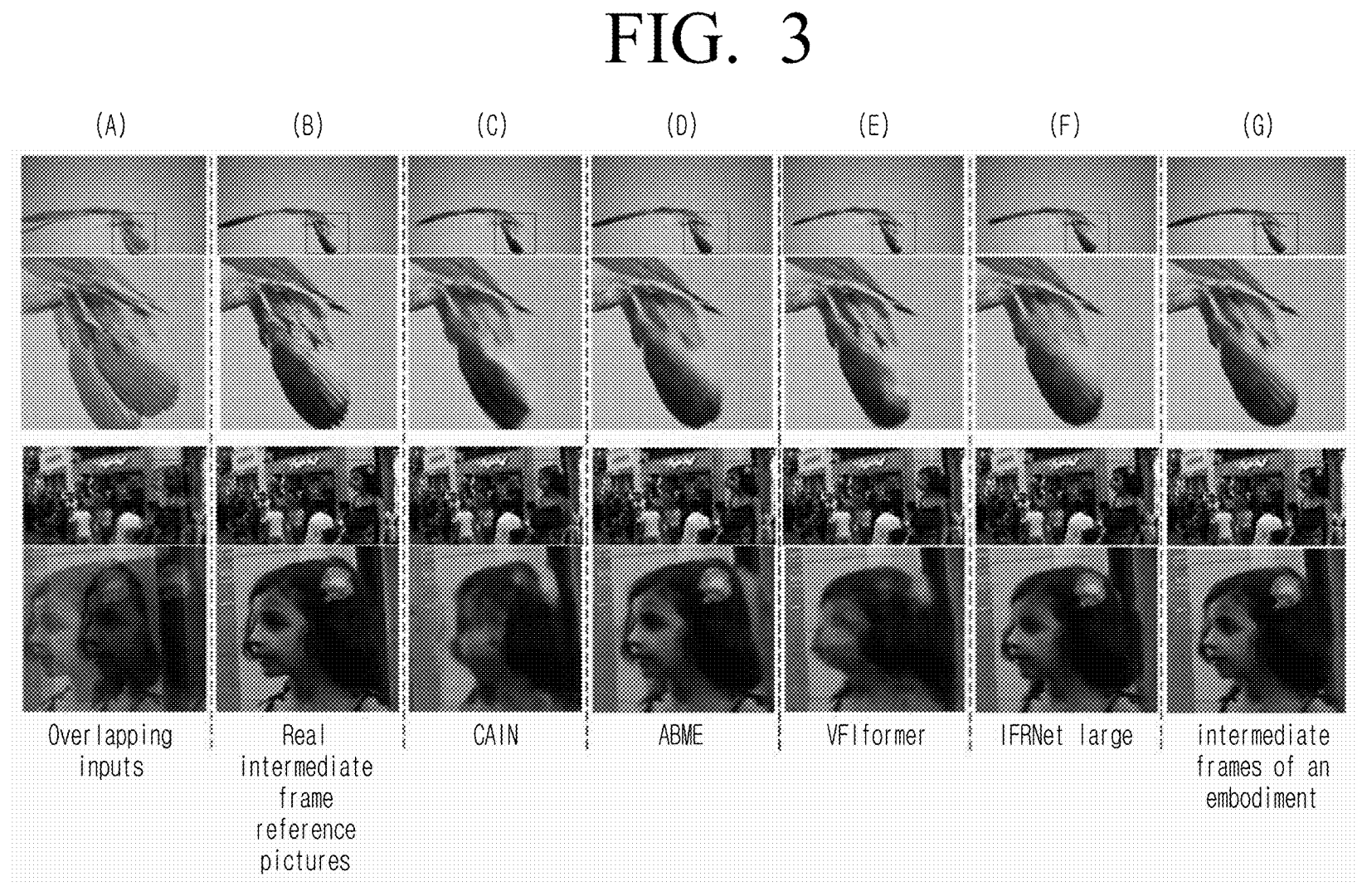

(A) Overlapping inputs (B) Real intermediate frame reference pictures (C) CAIN (D) ABME (E) VFIformer (F) IFRNet large (G) intermediate frames of an embodiment

METHOD AND APPARATUS FOR GENERATING VIDEO INTERMEDIATE FRAME

CROSS-REFERENCE TO RELATED APPLICATIONS

This application is a continuation application of International Application No. PCT/IB2024/052668, filed on Mar. 20, 2024, which claims priority to China Patent Application No. 202310745901.2, filed on Jun. 21, 2023, in the China National Intellectual Property Administration, the disclosures of which are incorporated by reference herein in their entireties.

BACKGROUND

1. Field

The present disclosure relates generally to computer vision technology, and more particularly, to a method and apparatus for generating a video intermediate frame.

2. Description of Related Art

Video frame interpolation may be an important application in computer vision technology. For example, video frame interpolation may attempt to improve a frame rate of a video by synthesizing frames that may not exist between consecutive frames of the video. In this manner, video frame interpolation may be utilized to make motion in the video appear to be smoother, and thereby potentially improve a viewing experience of a viewer of the video. For example, some older videos may have been limited by video capturing devices that may have been available at the time, and which may have relatively low frame rates (e.g., about 25 frames-per-second (FPS) or about 30 FPS), when compared to modern video capturing devices. As another example, modern video display devices (e.g., televisions and the like) may be able to support relatively high playback speeds (e.g., 120 FPS). When a modern video display device is used to play a low frame rate video, the viewing experience may generate a sense of buffering in the viewer of the video. Alternatively or additionally, high-performance advantages of the modern video display device may not be realized.

Artificial intelligence (AI) techniques may be used to potentially increase the frame rate of the video (e.g., up to 120 FPS) by the frame interpolation, and thereby, potentially improve the viewing experience. In addition, video frame interpolation technology may be used in other computer vision technology applications, such as, but not limited to, video compression, perspective synthesis, adaptive streaming media, and the like. For example, real-time high-definition video interaction may be increasing in importance, as a concept of the metaverse increases in popularity. However, real-time transmission of high-definition video streams with relatively high frame rate may be limited and/or constrained by network bandwidth. As such, transmitting a low frame rate video stream under a limited bandwidth condition, and then converting the low frame rate video into the high frame rate video at a client side using the video frame interpolation technology may be preferred.

Deep learning algorithms may have been applied to the field of video frame interpolation with significant success. For example, optical flow-based pixel synthesis may be considered as a mainstream algorithmic framework in the field of video frame interpolation. The algorithm may include steps and/or operations for estimating an optical flow between an input frame and a target frame, and/or guiding a synthesis of an intermediate frame using the optical flow. The optical flow may characterize a pixel-level motion between consecutive frames. That is, a pixel in the input frame may be moved onto the intermediate frame by a warp operation based on the optical flow (e.g., a forward-warping operation and/or a backward-warping operation). However, the warp operation may introduce unnatural artifacts to the video. For example, when an object is hidden and/or obscured from view (e.g., occlusion), a forward-warping operation may produce a black void and/or a backward-warping operation may produce a duplicate object. Therefore, after the warp operation, a frame synthesis network may be needed to fuse information of the pixels and features after the warp operation to generate a final intermediate frame that may eliminate the unnatural artifacts introduced by the warp operation and/or infer an appearance of the occluded object. The frame synthesis network may be and/or may include a network having an encoder-decoder structure, and/or may be referred to as a U-Net structure.

However, related techniques for generating the intermediate frame may incur relatively large computational overhead and may be unable to ensure a picture quality of the intermediate frame. For example, when using a related frame synthesis network to generate the intermediate frame, a same network depth (e.g., a stage number of the frame synthesis network) may be used for synthesis for all pixels of an image. That is, when generating the intermediate frame, a computation amount allocated to each pixel of an input picture may be the same. However, in practical application, synthesis difficulties may be different for different regions of the intermediate frame. For example, in a region of a frame where the optical flow may be intense and/or complex (e.g., non-linear motion), the synthesis difficulty may be higher than that of a region where the optical flow may be less intense (e.g., close to stationary) and/or simple (e.g., linear motion). That is, by applying synthesis networks with a same network depth to process all image regions, a synthesis depth adopted by some regions may not match a corresponding synthesis difficulty. For example, in regions where the optical flow may be less intense (and/or simple), a shallow frame synthesis network may be preferred and/or sufficient, however, a deep frame synthesis network may be used, thus possibly resulting in a waste of computational resources. As another example, in regions where the optical flow may be more intense and/or complex, a shallow frame synthesis network may be used, even though results may have been better if a the deep frame synthesis network may have been used. Therefore, from the perspective of visual effects, performing a frame synthesis calculation using a same network depth for all image regions may not ensure that an optimal picture quality is obtained.

SUMMARY

One or more example embodiments of the present disclosure provide a method and apparatus for generating a video intermediate frame, which may potentially reduce the computational overhead and/or improve the quality of the intermediate frame.

According to an aspect of the present disclosure, a method for generating a video intermediate frame includes performing a warp operation on a plurality of target video frames, based on a bidirectional optical flow between the plurality of target video frames, to obtain a plurality of pictures, determining a similarity between sub-pictures corresponding to image sub-regions in the plurality of pictures, predicting, based on the similarity, a network depth of a frame synthesis network matched with a corresponding image sub-region, the network depth increasing as the similarity decreases, performing synthetic processing on corresponding sub-pictures of each of the image sub-regions using the frame synthesis network having the network depth matched with the corresponding image sub-region, to obtain a plurality of images, and splicing the plurality of images to obtain intermediate frames of the plurality of target video frames, based on each of the image sub-regions.

According to an aspect of the present disclosure, a device for generating a video intermediate frame includes one or more processors, a memory storing instructions that, when executed by the one or more processors, cause the device to perform a warp operation on a plurality of target video frames, based on a bidirectional optical flow between the plurality of target video frames, to obtain a plurality of pictures, determine a similarity between sub-pictures corresponding to image sub-regions in the plurality of pictures, predict, based on the similarity, a network depth of a frame synthesis network matched with a corresponding image sub-region, the network depth increasing as the similarity decreases, perform synthetic processing on corresponding sub-pictures of each of the image sub-regions using the frame synthesis network having the network depth matched with the corresponding image sub-region, to obtain a plurality of images, and splice the plurality of images to obtain intermediate frames of the plurality of target video frames, based on each of the image sub-regions.

According to an aspect of the present disclosure, a non-transitory computer-readable storage medium stores computer-executable instructions for generating a video intermediate frame. The computer-executable instructions, when executed by at least one processor of a device, cause the device to perform a warp operation on a plurality of target video frames, based on a bidirectional optical flow between the plurality of target video frames, to obtain a plurality of pictures, determine a similarity between sub-pictures corresponding to image sub-regions in the plurality of pictures, predict, based on the similarity, a network depth of a frame synthesis network matched with a corresponding image sub-region, the network depth increasing as the similarity decreases, perform synthetic processing on corresponding sub-pictures of each of the image sub-regions using the frame synthesis network having the network depth matched with the corresponding image sub-region, to obtain a plurality of images, and splice the plurality of images to obtain intermediate frames of the plurality of target video frames, based on each of the image sub-regions.

According to an aspect of the present disclosure, a computer program product includes a computer program that, when executed by a processor, implements operations of a method for generating a video intermediate frame. The method includes performing a warp operation on a plurality of target video frames, based on a bidirectional optical flow between the plurality of target video frames, to obtain a plurality of pictures, determining a similarity between sub-pictures corresponding to image sub-regions in the plurality of pictures, predicting, based on the similarity, a network depth of a frame synthesis network matched with a corresponding image sub-region, the network depth increasing as the similarity decreases, performing synthetic processing on corresponding sub-pictures of each of the image sub-regions using the frame synthesis network having the network depth matched with the corresponding image sub-region, to obtain a plurality of images, and splicing the plurality of images to obtain intermediate frames of the plurality of target video frames, based on each of the image sub-regions.

Aspects of the present disclosure provide a method and an apparatus for generating a video intermediate frame proposed that may compare an image alignment degree between a pair of target video frames after a warp operation, and according to the image alignment degree (e.g., similarity) of each local image region (e.g., image sub-region) in a picture, a matched network depth of the frame synthesis network may be predicted for each local image region of an image, such that when processing using the frame synthesis network, each local image region of the image may adopt an optimal network depth, rather than all image regions using a same network depth. Thus, aspects of the present disclosure may provide for each local image region adopting a computation resource matching its own synthesis difficulty, thereby potentially reducing an overall computation amount in frame synthesis processing, potentially avoiding a waste of the computation resource, and potentially improving a synthesis efficiency. Alternatively or additionally, aspects of the present disclosure may provide for a frame synthesis effect corresponding to each local image region, thereby potentially improving a picture quality of the intermediate frame.

Further, one or more example aspects of the present disclosure provide for predicting the depth of the frame synthesis network based on the picture after the warp operation. Thus, target video frames may be aligned firstly using the warp operation, so that even if spatial positions of corresponding pixels may not completely overlap, the target video frames may not deviate such that a size of the local image region may be set relatively small. Consequently, a strong constraint of an optical flow scale on the size of the local region may be removed, such that for a large-scale optical flow, a corresponding intermediate frame picture may be accurately estimated, thereby potentially enhancing the robustness of the large-scale optical flow. Alternatively or additionally, for a low-resolution video, aspects of the present disclosure provide for dynamically determining the network depth of each local image region and performing a corresponding local image synthesis processing, such that embodiments of the present disclosure may apply to high-resolution videos and/or low-resolution videos.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 1 is a schematic diagram of a method flow, according to an embodiment;

FIG. 3 is an example diagram comparing effects of an embodiment of the present disclosure and a related video frame interpolation solution in a scene of a single frame video frame interpolation, according to an embodiment;

DETAILED DESCRIPTION

Figure 2A:
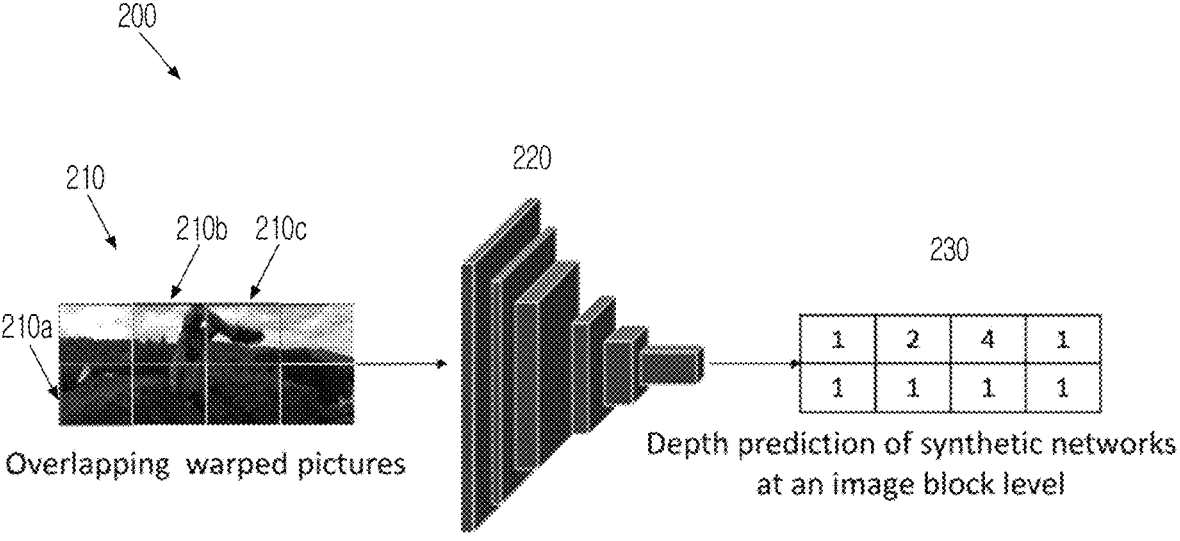
FIGS. 2A and 2B depict example diagrams of predicting a matched depth of a frame synthesis network for each image sub-region, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

FIG. 1 is a schematic diagram of a method flow according to an embodiment. Referring to FIG. 1, a method 100 for generating a video intermediate frame may include operations 101 to 104.

At operation 101, a warp operation may be performed on two (2) or more target video frames based on a bidirectional optical flow between the target video frames to obtain two (2) or more pictures.

In an embodiment, image synthesis processing may need to be performed separately for each local image region in subsequent operations, in order to potentially reduce and/or eliminate the computation overhead of frame synthesis and/or potentially improve a generation quality of an intermediate frame. For example, when a pixel offset caused by a large-scale optical flow is large and a scale of the optical flow exceeds a size of the local image region, the intermediate frame may be able to be estimated. Consequently, it may be necessary to set the size of the local image region to be relatively large so that a frame synthesis network may be able to handle the pixel offset caused by the large-scale optical flow inside the local image region. However, when the local image region is relatively large, the frame synthesis network may only be able to process high-resolution videos into blocks, rather than being able to adaptively compute low-resolution videos into blocks so that the frame synthesis network may only be applied to the high-resolution videos.

An embodiment of the present disclosure may need to perform the warp operation on two (2) or more target video frames before performing frame synthesis. Thus, since pixels of the two (2) or more inputted target video frames may be aligned to the intermediate frame based on a forward-warping operation from the input video frame to the intermediate frame, and/or a backward-warping operation from the intermediate frame to the input video frame, a position deviation between the corresponding pixels in the two (2) or more target video frames may be reduced by performing the warp operation first. In addition, even if spatial positions of the corresponding pixels do not completely overlap, the corresponding pixels may not deviate relatively far. As such, it may not be necessary to set the local image region to be relatively large when the synthesis processing is performed separately for the local image region in subsequent operations. Thus, in the case of the large-scale optical flow, the warp operation may remove a strong correlation between the optical flow scale and the size of the local image region, and the intermediate frame may be estimated relatively accurately without setting the local image region to a relatively large size, thereby potentially enhancing the robustness of the solution in the case of the large-scale optical flow. Alternatively or additionally, in the case of the low-resolution video, it may be possible to dynamically determine the network depth of each local image region and perform a corresponding synthesis processing so that embodiments of the present disclosure may apply not only to the high-resolution video but also to the low-resolution video.

In an embodiment, since convolutional neural network (CNN) features obtained after the warp operation may provide rich context information, during the subsequent frame synthesis processing, the frame synthesis network may also obtain these CNN features as an input while inputting the pictures after the warp operation as an input. The frame synthesis network may use the CNN features to potentially improve the robustness of the intermediate frame generation.

In practical application, an existing optical flow estimation method may be specifically adopted to obtain the bidirectional optical flow between two (2) or more target video frames.

In an embodiment, the forward-warping operation may be more convenient to implement than the backward-warping operation, and as such, the warp operation in operation 101 may be implemented as the forward-warping operation to potentially further reduce the computation overhead and improve a generation efficiency of the intermediate frame.

At operation 102, a network depth of a frame synthesis network matched with a respective image sub-region may be predicted, according to a similarity of two (2) or more sub-pictures corresponding to each image sub-region in the two (2) or more pictures, using a strategy in which the smaller the similarity is, the greater the network depth may be. In an embodiment, the network depth may be inversely proportional to the similarity. That is, the network depth may increase as the similarity decreases.

Operation 102 may be performed to determine a matched depth of the frame synthesis network for each local image region (e.g., image sub-region) so as to potentially avoid a waste of computation resources during the frame synthesis, potentially reduce an overall frame synthesis overhead, and potentially improve the efficiency and quality of generating the intermediate frame by predicting the matched network depth for each local image region.

The network depth may refer and/or indicate a stage number of the frame synthesis network. A stage in a CNN may be associated with a size of an outputted feature map. In an embodiment, sizes of the feature maps may be substantially similar and/or the same in each stage of the CNN. If the size of the feature map changes significantly, a next stage may be entered. That is, if output resolutions of consecutive convolutional layers are the same, these convolutional layers may be in a same stage. In an embodiment, a stage number of an initial convolutional layer may be one (1). When a convolutional layer performs a down-sampling operation, a resolution of its outputted feature map may be reduced and the stage number may be increased by one (1).

Figure 2B:
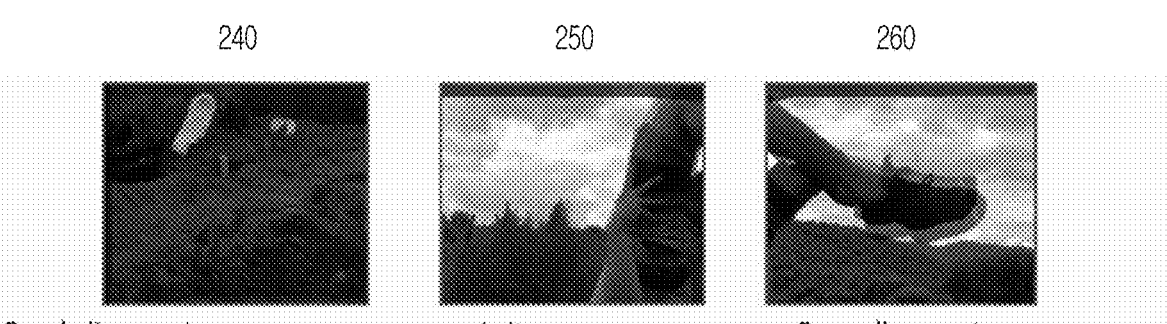

FIG. 2A shows an example 200 of predicting a matched depth 230 of the frame synthesis network for each image sub-region based on two pictures after the warp operation. FIG. 2B is a partial enlarged diagram of a part of the sub-pictures in a picture 210 of FIG. 2A. As shown in FIG. 2A, pictures of two input video frames obtained by the warp operation may be overlapped together (e.g., the picture 210), and it may be seen that pixels of most regions may be overlapped together (e.g., first sub-picture 210a of FIG. 2A, and a first picture 240 of FIG. 2B, which is an enlarged diagram of the first sub-picture 210a). Two pictures after the warp operation may be interpreted as rough predictions of the intermediate frame. If a consistency of these two predicted pictures in a certain part is relatively high (e.g., the pixels are completely aligned), the similarity between a local image block after the warp and a local image block of the intermediate frame may also be relatively high. For such a local image block, a high quality image synthesis result may be obtained using a shallow frame synthesis network. However, pixels in some local image blocks (e.g., second sub-picture 210b and third sub-picture 210c of FIG. 2A, and second picture 250 and third picture 260 of FIG. 2B, which may be enlarged diagrams of the second and third sub-pictures 210b and 201c, respectively) may not be aligned due to an inaccurate optical flow estimation and/or an occlusion between objects. In order to relatively accurately infer the local image blocks corresponding to the intermediate frames from these inconsistent local image blocks, the frame synthesis network may need to have a large model space and/or receptive field. Consequently, a deep frame synthesis network may be needed to process these local blocks. Therefore, in operation 102, by predicting the matched network depth 230 for each local image region, based on the similarity between two sub-pictures corresponding to the region in two input frames, the optimization of the depth of the frame synthesis network adopted by each local image region may be effectively ensured.

For example, in an embodiment, a lightweight fully convolutional network (FCN) 220 may be used to predict the network depth 230 of the frame synthesis network matched with each image sub-region based on the two pictures obtained by the warp operation (operation 101).

In practical application, an optical flow estimation network, the FCN 220, and the frame synthesis network may be integrated into an intermediate frame generation model in advance. Alternatively or additionally, the integrated models may be trained together. For example, when training the integrated models, that may use two sample video frames as input data of the integrated models, generation processing of corresponding intermediate frames may be performed, and intermediate frames may be obtained based on an output result and respective real intermediate frames may be used to calculate a loss function, and network parameters of the integrated models may be separately or jointly optimized and/or adjusted based on the obtained loss function values.

The size of the image sub-region may be used for dividing the picture into several local image blocks (e.g., sub-pictures) so as to determine the depth of the frame synthesis network dynamically and locally. In an embodiment, the size of the image sub-region may set to an appropriate size according to practical needs and/or design constraints in advance. In an embodiment, since the warp operation may be applied to the input video frame, the size of the image sub-region may be set to be relatively small. For example, the size of the image sub-region may be less than or equal to 64×64 dots-per inch (dpi).

Returning to FIG. 1, at operation 103, synthetic processing may be performed on corresponding sub-pictures for each image sub-region using the frame synthesis network according to the network depth matched with the respective image sub-region.

In operation 103, frame synthesis networks with different depths may be used to process the synthesis of different image blocks (e.g., sub-pictures), based on a network depth prediction result of each image sub-region obtained in operation 102. For example, a synthesis difficulty may be relatively large for image sub-regions with a relatively poor alignment after the warp operation, and as such, a deep frame synthesis network may need to be used for synthesis. As another example, a shallow frame synthesis network may provide a good synthesis for image blocks of image sub-region with a relatively low synthesis difficulty. That is, multiple different frame synthesis networks may not be needed. Instead, one deep frame synthesis network may be applied to image sub-regions with both relatively low and high levels of synthesis difficulty. When performing the frame synthesis, for each image sub-region, according to a network depth corresponding to the image sub-region, a parameter of a corresponding depth of the frame synthesis network may be used for processing.

In practical application, for two consecutive high-resolution pictures, existence of a complex and/or large-scale optical flow region may be relatively small, and most regions of the pictures may either have no optical flow or only a simple linear optical flow. Thus, most image sub-regions may need only be processed with the shallow frame synthesis network. Therefore, in operation 103, the synthesis processing may be performed separately for different image sub-regions using a matched network depth parameter, which generally may reduce the computation amount and improve the efficiency of the frame synthesis processing. In addition, since the network depth of each image sub-region is matched with the similarity of two corresponding sub-pictures, an influence of the network depth parameter that may not match with the synthesis difficulty on a synthesis processing result may be avoided, and the generation quality of the intermediate frame may effectively ensured.

In an embodiment, the frame synthesis network may be implemented as a U-Net network, as related U-Net network may have a relatively simple network structure and may be convenient to apply.

At operation 104, images obtained by the synthetic processing may be spliced to obtain an intermediate frame of the target video frames, according to each of the image sub-regions.

In operation 104, according to the image sub-region to which each image belongs, images obtained in operation 103 may be spliced based on a positional relationship between the image sub-regions so as to obtain a complete video frame. The video frame may be the intermediate frame between two target video frames.

That is, different local image regions may be distinguished based on pictures of two target video frames after the warp operation, and the synthesis processing may be performed using the depth of the frame synthesis network matched with the synthesis difficulty. Thus, the computation overhead may be reduced, and the efficiency and quality of generating the intermediate frame may be improved. In addition, by first performing the warp operation on the target video, embodiments of the present disclosure may better handle the case of large-scale optical flow and may be applied not only to the high-resolution video but also to the low-resolution video. Application of embodiments of the present disclosure are described below in connection with several application examples.

1. Single Frame Video Frame Interpolation

A common video frame interpolation requirement may be that two video frames (e.g., first frame-0 and second frame-1) may be inputted, and that an intermediate frame thereof (e.g., intermediate frame-0.5) may be synthesized through a model. FIG. 3 shows an example diagram comparing effects of an embodiment of the present disclosure and related video frame interpolation algorithms.

As shown in FIG. 3, the first column (A) includes multiple pairs of two input video frames that coincide together, the second column (B) includes real intermediate frame reference pictures, the third to sixth columns (C) to (F) includes intermediate frames respectively generated using four (4)

related frame interpolation methods (e.g., CAIN, ABME, VFIformer, and IFRNet large methods), and the seventh column (G) includes the intermediate frames generated using embodiments of the present disclosure.

In particular, third column (C) includes intermediate frames generated using Channel Attention Is All You Need (CAIN) video frame interpolation, fourth column (D) includes intermediate frames generated using asymmetric bilateral motion estimation (ABME) video frame interpolation, fifth column (E) includes intermediate frames generated using video frame interpolation with transformer (VFIformer), and sixth column (F) includes intermediate frames generated using intermediate feature refine network (IFRNet) large video frame interpolation. The second and fourth rows depict partially enlarged diagrams of pictures of the corresponding columns in the first and third rows, such that subtle differences between different pictures may be more easily seen from the partially enlarged diagrams. As may be seen from the partially enlarged diagrams, embodiments of the present disclosure may achieve acceptable results in the case of very large optical flows (e.g., the second row) and in the case of locally complex non-linear optical flows (e.g., the fourth row).

2. Multi-Frame Video Frame Interpolation

Figure 4:
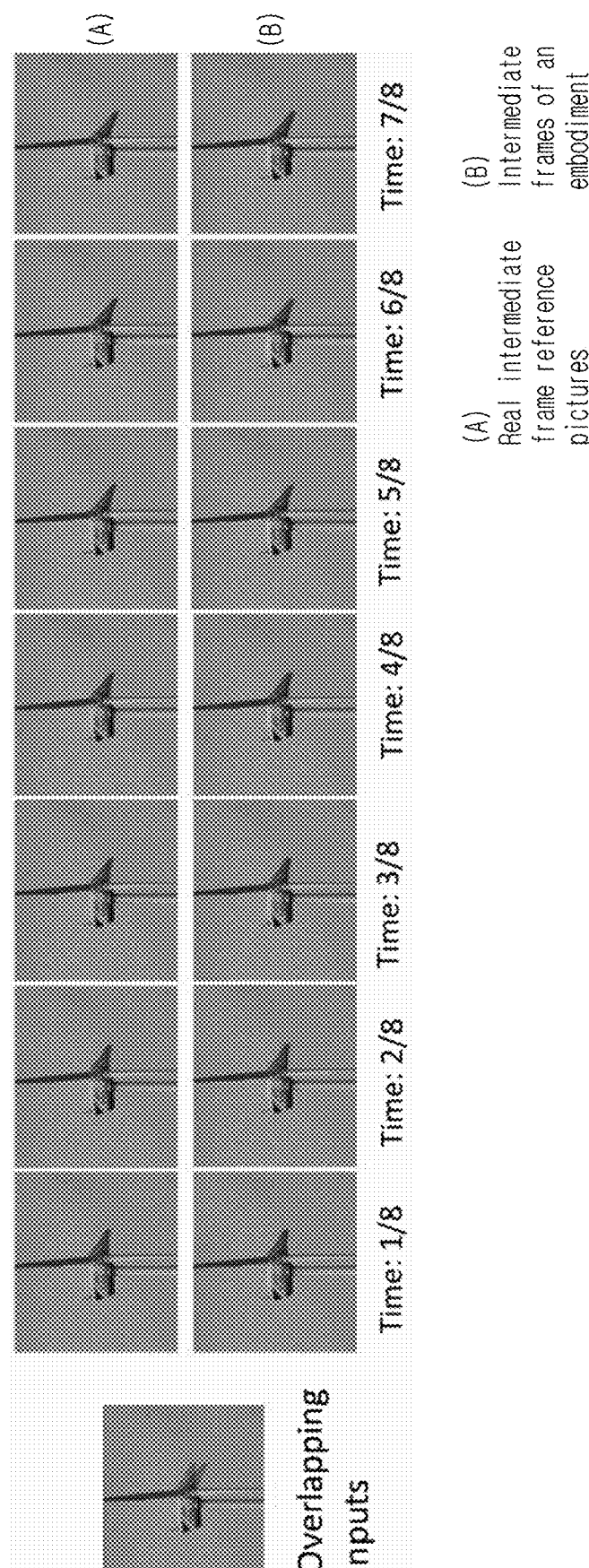
FIG. 4 is an example diagram of an effect of generating multiple intermediate frames, according to an embodiment.

In a case where a frame rate of an original video is relatively low (e.g., 25 FPS), it may be needed to insert multiple frames between two consecutive frames to allow the video to reach a higher frame rate (e.g., 120 FPS). Based on linear weighting, an optical flow from the input frame to an intermediate frame at any time may be approximately obtained from the bidirectional optical flow, and then combined with the forward-warping operation, and as such, the intermediate frame at any time may be synthesized. FIG. 4 shows an example diagram of an effect of generating multiple intermediate frames using embodiments of the present disclosure. In FIG. 4, a first row (A) includes real intermediate frame reference pictures, and a second row (B) includes intermediate frames obtained by using an embodiment of the present disclosure. As shown in FIG. 4, the multiple intermediate frames obtained by using an embodiment of the present disclosure (e.g., row (B)) may be substantially similar to the real intermediate frame reference pictures (e.g., row (A)).

3. Other Application Based on Video Frame Interpolation

Since embodiments of the present disclosure may efficiently and robustly estimate the intermediate frame between neighboring video frames, the present disclosure may also be applied to other downstream applications based on video frame interpolation algorithms, such as, but not limited to, video compression, video enhancement, perspective synthesis, and the like. For example, real-time high-definition video interaction may be increasing in importance as a concept of the metaverse increases in popularity. As such, transmitting a low frame rate video stream under a limited bandwidth condition, and converting the low frame rate video into the high frame rate video at a client using the video frame interpolation technology may be used.

Figure 5:
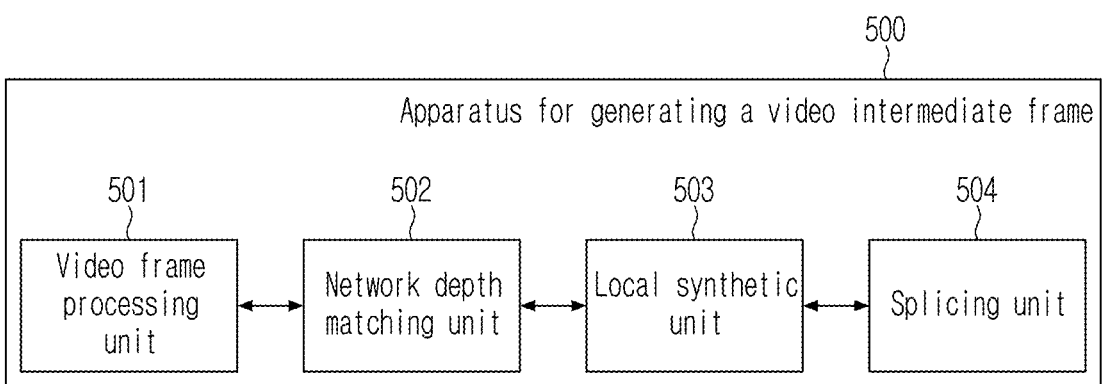
FIG. 5 is a schematic structural diagram of an apparatus, according to an embodiment.

FIG. 5 illustrates a block diagram of an example apparatus for generating a video intermediate frame. As shown in FIG. 5, the apparatus 500 may include a video frame processing unit 501, a network depth matching unit 502, a local synthetic unit 503, and a splicing unit 504.

The video frame processing unit 501 may be configured to perform a warp operation on two target video frames based on a bidirectional optical flow between the target video frames to obtain two pictures.

The network depth matching unit 502 may be configured to predict, according to a similarity of two sub-pictures corresponding to each image sub-region in the two pictures, a network depth of a frame synthesis network matched with a respective image sub-region, using a strategy that the smaller the similarity is, the greater the network depth may be.

The local synthetic unit 503 may be configured to perform synthetic processing on corresponding sub-pictures for each image sub-region using the frame synthesis network according to the network depth matched with the respective image sub-region.

The splicing unit 504 may be configured to splice images obtained by the synthetic processing to obtain an intermediate frame of the target video frames, according to each of the image sub-regions.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally or alternatively, a set of (one or more) components shown in FIG. 5 may perform one or more functions described in reference to FIGS. 1 to 4. Consequently, repeated descriptions of the functions described above with reference to FIGS. 1 to 4 may be omitted for the sake of brevity.

Embodiments of the present disclosure may also be applied to a device for generating a video intermediate frame. The device may include a processor and a memory. An application program executable by the processor may be stored in the memory and may be configured to cause the processor to perform the method for generating a video intermediate frame as described with reference to FIGS. 1 to 5. For example, a system and/or apparatus may be provided that is equipped with a storage medium on which a software program code that implements functions of any one of the implementations in the above-mentioned embodiments is stored, and causes a computer (and/or a central processing unit (CPU), microprocessor unit (MPU), and the like) of the system and/or apparatus to read out and execute the program code stored in the storage medium. The device may perform operations based on the processor executing computer-readable instructions and/or code that may be stored by a non-transitory computer-readable medium, such as the memory and/or the storage component. A computer-readable medium may refer to a non-transitory memory device. A non-transitory memory device may include memory space within a single physical storage device and/or memory space spread across multiple physical storage devices. Non-transitory computer-readable media may exclude transitory signals.

In addition, some or all of the practical operations may be completed by an operating system or the like operating on the computer through instructions based on the program code. The program code read from the storage medium may also be written into a memory provided in an expansion board inserted into the computer or a memory provided in an expansion unit connected to the computer, and then an instruction based on the program code causes a CPU or the like installed on the expansion board or the expansion unit to perform some or all of the practical operations, thereby realizing the functions of any one of the above-mentioned method for generating a video intermediate frame implementations.

The memory may be and/or may include various storage media such as, but not limited to, an electrically erasable programmable read-only memory (EEPROM), a flash memory, and a programmable program read-only memory (PROM). The processor may be and/or may include one or more central processing units (CPUs) or one or more field programmable gate arrays (FPGAs), where the field programmable gate arrays may integrate one or more CPU cores. That is, the CPU and/or the CPU core may be implemented as a CPU and/or an MCU.

Embodiments of the present application may also be applied to a computer program product, including a computer program/instruction, and when executed by the processor, the computer program/instruction may implement the operations of the method for generating a video intermediate frame as described with reference to FIGS. 1 to 5.

It is to be understood that not all the operations and modules in the above-mentioned flowcharts and structure diagrams may be necessary, and that some operations or modules may be omitted according to practical needs. An order in which each operation is performed is not fixed and may be adjusted as desired. The division of various modules is merely to facilitate the description of the functional division adopted, and in a practical implementation, one module may be implemented by multiple modules, functions of multiple modules may also be implemented by a same module, and these modules may be located in a same device or different devices.

Hardware modules in the various implementations may be implemented mechanically and/or electronically. For example, one hardware module may include a specially designed permanent circuit or logic device (e.g., a dedicated processor, such as an FPGA, an application-specific integrated circuit (ASIC), and the like) for completing a particular operation. The hardware module may also include a programmable logic device and/or circuit (e.g., a general purpose processor or other programmable processors) temporarily configured by software for performing a particular operation. Implementation of the hardware modules mechanically, using a dedicated permanent circuit, or using a temporarily configured circuit (e.g., configured by software) may be determined based on cost and time considerations.

Herein, schematic may refer to serving as an instance, example, or description, and any illustration, implementation described herein as a schematic may not be construed as a more preferred or advantageous technical solution. In order to make the drawings concise, only those parts of the drawings that are related to the present disclosure are schematically depicted and are not representative of a practical structure of the product. In addition, in order to make the drawings concise and easy to understand, only one of the components having a same structure or function in some of the drawings is schematically depicted, or one of them is marked. Herein, "a" may not be intended to limit the number of relevant parts of the present disclosure to "only one", and "a" may be not interpreted to exclude the case that the number of relevant parts of the present disclosure is "more than one". Herein, "upper", "lower", "front", "back", "left", "right", "inside", "outside", and the like may be used merely to represent relative positional relationships between relevant parts and may not limit absolute positions of these relevant parts.

The embodiments described in the present disclosure, if involving personal information processing, may be processed on the premise of legality (e.g., obtaining the consent of the personal information subject or being necessary for the performance of the contract), and may only be processed within the specified or agreed scope. A user may refuse to process personal information other than the necessary information required for basic functions without affecting the user's use of basic functions.

In summary, the above are only better embodiments of the present disclosure and may not be intended to limit the scope of the present disclosure. Any modification, equivalent substitution, improvement, and so on made within the spirit and principle of the present disclosure may be included in the scope of the present disclosure.

What is claimed is:

1. A method for generating a video intermediate frame, the method comprising:

performing a warp operation on a plurality of target video frames, based on a bidirectional optical flow between the plurality of target video frames, to obtain a plurality of pictures;

determining a similarity between sub-pictures corresponding to image sub-regions in the plurality of pictures;

predicting, based on the similarity, a network depth of a frame synthesis network matched with a corresponding image sub-region, the network depth increasing as the similarity decreases;

performing synthetic processing on corresponding sub-pictures of each of the image sub-regions using the frame synthesis network having the network depth matched with the corresponding image sub-region, to obtain a plurality of images; and splicing the plurality of images to obtain intermediate frames of the plurality of target video frames, based on each of the image sub-regions.

2. The method of claim 1, wherein the performing of the warp operation comprises:

performing a forward-warping operation on the plurality of target video frames.

3. The method of claim 1, wherein a size of each of the image sub-regions is less than or equal to 64×64 dots-per-inch (dpi).

4. The method of claim 1, wherein the predicting of the network depth comprises:

predicting the network depth of the frame synthesis network based on the plurality of pictures and using a fully convolutional network (FCN).

5. The method of claim 1, wherein the frame synthesis network comprises a U-Net network.

6. The method of claim 1, wherein the performing of the synthetic processing comprises:

performing synthetic processing on the corresponding sub-pictures of a first image sub-region of the image sub-regions using the frame synthesis network with a first network depth matched to the first image sub-region; and performing synthetic processing on the corresponding sub-pictures of a second image sub-region of the image sub-regions using the frame synthesis network with a second network depth matched to the second image sub-region, wherein a first similarity of the corresponding sub-pictures of the first image sub-region is greater than a second similarity of the corresponding sub-pictures of the second image sub-region, and wherein the first network depth is less than the second network depth.

7. The method of claim 1, wherein the performing of the warp operation comprises performing the warp operation using an optical flow estimation network, wherein the predicting of the network depth comprises predicting the network depth of the frame synthesis network using a fully convolutional network (FCN), and wherein the method further comprises integrating at least one of the optical flow estimation network, the FCN, and the frame synthesis network into an intermediate frame generation model.

8. The method of claim 7, further comprising:

training the intermediate frame generation model, wherein the training of the intermediate frame generation model comprises:

providing sample video frames as input data to the intermediate frame generation model;

generating intermediate frames corresponding to the sample video frames;

calculating loss function values based on the intermediate frames corresponding to the sample video frames; and adjusting, based on the loss function values, at least one network parameter of at least one of the optical flow estimation network, the FCN, and the frame synthesis network.

9. A device for generating a video intermediate frame, comprising:

one or more processors;

a memory storing instructions that, when executed by the one or more processors, cause the device to:

perform a warp operation on a plurality of target video frames, based on a bidirectional optical flow between the plurality of target video frames, to obtain a plurality of pictures;

determine a similarity between sub-pictures corresponding to image sub-regions in the plurality of pictures;

predict, based on the similarity, a network depth of a frame synthesis network matched with a corresponding image sub-region, the network depth increasing as the similarity decreases;

perform synthetic processing on corresponding sub-pictures of each of the image sub-regions using the frame synthesis network having the network depth matched with the corresponding image sub-region, to obtain a plurality of images; and splice the plurality of images to obtain intermediate frames of the plurality of target video frames, based on each of the image sub-regions.

10. The device of claim 9, wherein the instructions, when executed by the one or more processors, further cause the device to:

perform a forward-warping operation on the plurality of target video frames.

11. The device of claim 9, wherein a size of each of the image sub-regions is less than or equal to 64×64 dots-per-inch (dpi).

12. The device of claim 9, wherein the instructions, when executed by the one or more processors, further cause the device to:

predict the network depth of the frame synthesis network based on the plurality of pictures and using a fully convolutional network (FCN).

13. The device of claim 9, wherein the frame synthesis network comprises a U-Net network.

14. The device of claim 9, wherein the instructions, when executed by the one or more processors, further cause the device to:

perform synthetic processing on the corresponding sub-pictures of a first image sub-region of the image sub-regions using the frame synthesis network with a first network depth matched to the first image sub-region; and perform synthetic processing on the corresponding sub-pictures of a second image sub-region of the image sub-regions using the frame synthesis network with a second network depth matched to the second image sub-region, wherein a first similarity of the corresponding sub-pictures of the first image sub-region is greater than a second similarity of the corresponding sub-pictures of the second image sub-region, and wherein the first network depth is less than the second network depth.

15. The device of claim 9, wherein the instructions, when executed by the one or more processors, further cause the device to:

perform the warp operation using an optical flow estimation network;

predict the network depth of the frame synthesis network using a fully convolutional network (FCN), and integrate at least one of the optical flow estimation network, the FCN, and the frame synthesis network into an intermediate frame generation model.

* * * * *